United States Patent
Maus et al.

(10) Patent No.: US 7,083,860 B2
(45) Date of Patent: Aug. 1, 2006

(54) METALLIC HONEYCOMB BODY HAVING AT LEAST PARTIALLY PERFORATED SHEET-METAL LAYERS

(75) Inventors: Wolfgang Maus, Bergisch Gladbach (DE); Rolf Brück, Bergisch Gladbach (DE); Peter Hirth, Köln (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 11/058,991

(22) Filed: Feb. 16, 2005

(65) Prior Publication Data

US 2005/0170957 A1    Aug. 4, 2005

Related U.S. Application Data

(63) Continuation of application No. PCT/EP03/07722, filed on Jul. 16, 2003.

(30) Foreign Application Priority Data

Aug. 16, 2002  (DE) ................. 102 37 512
Oct. 31, 2002  (DE) ................. 102 50 894
Mar. 28, 2003  (DE) ................. 103 14 085

(51) Int. Cl.
*F01N 3/28*    (2006.01)
*B01J 35/04*   (2006.01)
*B32B 3/24*    (2006.01)
*B32B 3/28*    (2006.01)

(52) U.S. Cl. .............. 428/593; 428/596; 502/439; 502/527.22; 422/180

(58) Field of Classification Search ............. None
See application file for complete search history.

(56) References Cited

U.S. PATENT DOCUMENTS 4,273,681 A    6/1981    Nonnenmann (Continued)

FOREIGN PATENT DOCUMENTS

DE    29 02 779 A1    7/1980

(Continued)

OTHER PUBLICATIONS

Translation of JP-05-309277, Nov. 22, 1993, 17 pages.*

*Primary Examiner*—John J. Zimmerman
(74) *Attorney, Agent, or Firm*—Laurence A. Greenberg; Werner H. Stemer; Ralph E. Locher

(57) ABSTRACT

A metallic honeycomb body has an axial length, a partial volume covering at least 55% of the axial length, a radial dimension of at least 20 mm, an inflow end side and an outflow end side. The honeycomb body includes sheet-metal layers structured to permit a fluid to flow through the honeycomb body in a flow direction from the inflow end side to the outflow end side. The sheet-metal layers each have a surface area, partial regions and edges at the end sides. Each of the sheet-metal layers have a multiplicity of holes formed at least in the partial regions in the partial volume. Each of the holes have a hole surface area of between 1 and 120 mm². The sheet-metal layer surface area in the partial volume is reduced by 10 to 80% by the holes as compared to a sheet-metal layer without holes. The partial volume is disposed at a distance from each of the end sides, preventing the holes from touching and from cutting through the edges of the end sides of the sheet-metal layers.

38 Claims, 5 Drawing Sheets

U.S. PATENT DOCUMENTS

| | | | |
|---|---|---|---|
| 4,832,998 A | | 5/1989 | Cyron |
| 5,045,403 A | | 9/1991 | Maus et al. |
| 5,105,539 A | | 4/1992 | Maus et al. |
| 5,157,010 A | | 10/1992 | Maus et al. |
| 5,370,943 A | * | 12/1994 | Bruck et al. .................. 428/593 |
| 5,403,559 A | | 4/1995 | Swars |
| 5,514,347 A | * | 5/1996 | Ohashi et al. ............... 422/174 |
| 5,599,509 A | | 2/1997 | Toyao et al. |
| 5,643,484 A | * | 7/1997 | Swars et al. ................. 219/552 |
| 5,648,050 A | | 7/1997 | Matsumoto et al. |
| 5,791,043 A | | 8/1998 | Okabe et al. |
| 6,190,784 B1 | | 2/2001 | Maus et al. |
| 6,254,837 B1 | * | 7/2001 | Bruck et al. .................. 422/180 |
| 6,761,980 B1 | * | 7/2004 | Sato et al. ................... 428/593 |

FOREIGN PATENT DOCUMENTS

| | | | |
|---|---|---|---|
| DE | 88 16 154.4 U1 | | 3/1989 |
| DE | 42 10 784 A1 | | 10/1993 |
| EP | 0 215 253 B1 | | 3/1987 |
| EP | 0 245 737 B1 | | 11/1987 |
| EP | 0 216 130 B1 | | 4/1989 |
| EP | 0 705 962 B1 | | 4/1996 |
| JP | 01012018 | | 1/1989 |
| JP | 05309277 | | 11/1993 |
| WO | 90/03220 | | 4/1990 |
| WO | 90/08249 | | 7/1990 |
| WO | 91/01178 | | 2/1991 |
| WO | 91/01807 | | 2/1991 |
| WO | 97/49905 | | 12/1997 |
| WO | WO 02/040156 | * | 5/2002 |

* cited by examiner

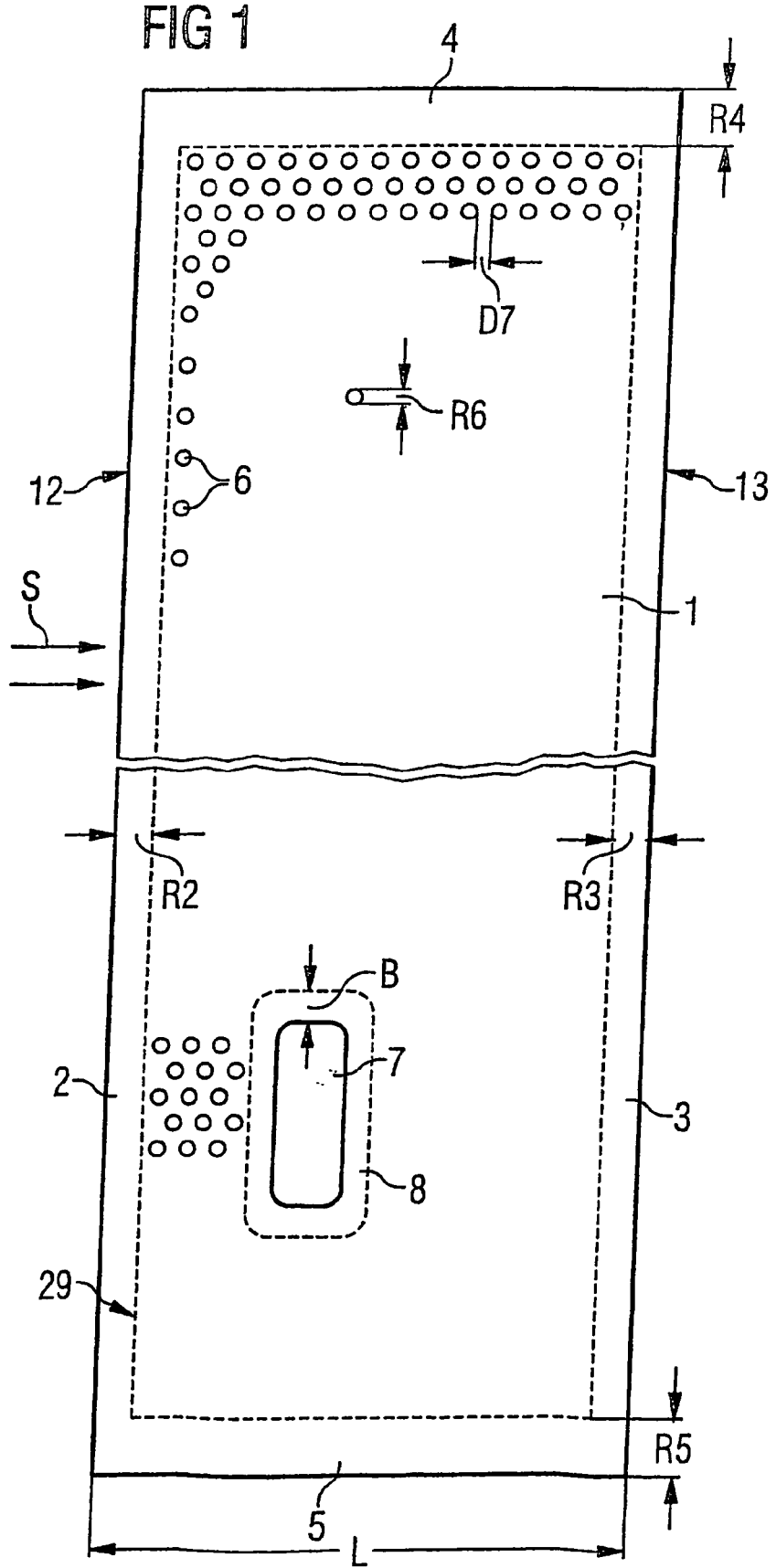

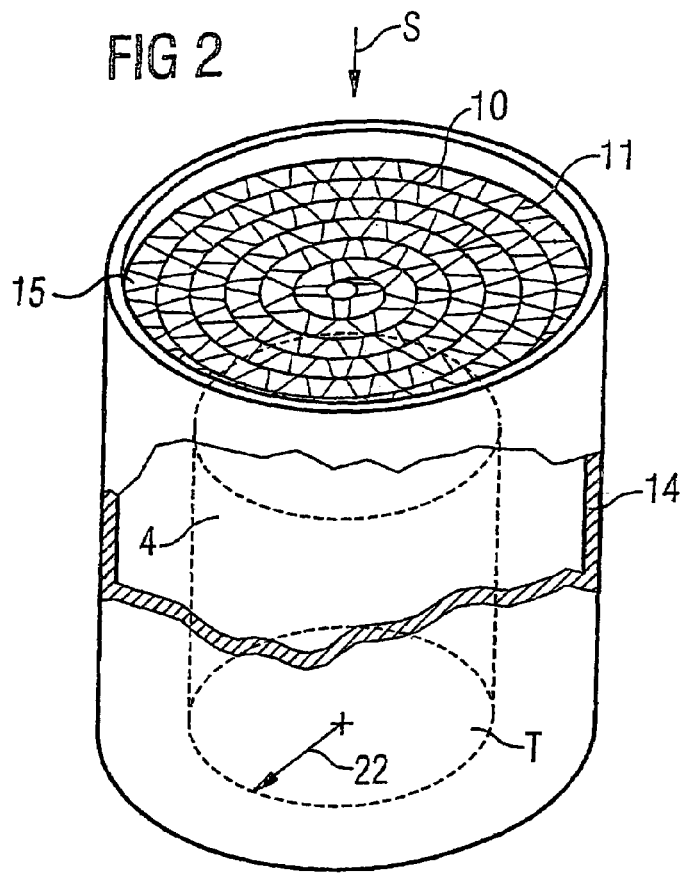
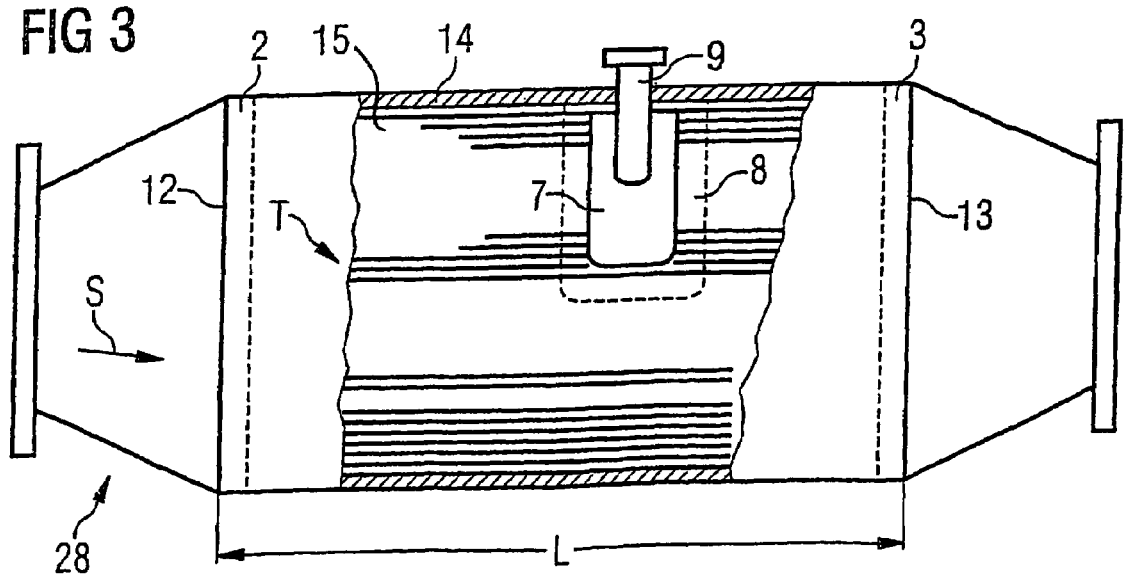

ic honeycomb body, in particular to a honeycomb body for an exhaust system of an internal combustion engine. Such honeycomb bodies are used as carriers for catalytically active material and/or for adsorber material and similar applications.

METALLIC HONEYCOMB BODY HAVING AT LEAST PARTIALLY PERFORATED SHEET-METAL LAYERS

CROSS-REFERENCE TO RELATED APPLICATION

This is a continuing application, under 35 U.S.C. § 120, of copending international application No. PCT/EP2003/007722, filed Jul. 16, 2003, which designated the United States; this application also claims the priorities, under 35 U.S.C. § 119, of German patent application No. 102 37 512.7, filed Aug. 16, 2002, German patent application No. 102 50 894.1, filed Oct. 31, 2002, and German patent application No. 103 14 085.9, filed Mar. 28, 2003; the prior applications are herewith incorporated by reference in their entirety.

BACKGROUND OF THE INVENTION

Field of the Invention

The present invention relates to a metallic honeycomb body, in particular to a honeycomb body for an exhaust system of an internal combustion engine. Such honeycomb bodies are used as carriers for catalytically active material and/or for adsorber material and similar applications.

Metallic honeycomb bodies which are used in particular for the purification of exhaust gases in internal combustion engines have to satisfy very different demands, and in some cases compromises have to be made between contradictory requirements. First of all, honeycomb bodies of that type should provide the maximum possible surface area at which the desired catalytic reactions or adsorption processes can take place. In many applications, a low heat capacity is desired, so that the honeycomb body is either quickly heated to its desired operating temperature or should also have a high heat capacity, so that it can remain at operating temperature for a longer time but cannot be heated to excessively high temperatures too quickly. Of course, a configuration of that type must in general terms be mechanically stable, i.e. must be able to withstand a pulsating gas flow as well as mechanical loads caused by movement of the vehicle. The material of the honeycomb bodies must be resistant to high-temperature corrosion and it must also be possible to machine the material in such a way that the desired honeycomb structures can be produced easily and at low cost. In many cases, particular structures are also required within the honeycomb body in order to influence flow, for example to improve contact with the surface or to effect cross-mixing. Finally, it must be possible for a suitable honeycomb body to be produced at low cost in mass production.

Individual aspects of the above-mentioned problems have been described extensively in numerous documents which form part of the prior art.

A distinction is drawn in particular between two typical forms of metallic honeycomb bodies. An early form, of which German Published, Non-Prosecuted Patent Application DE 29 02 779 A1, corresponding to U.S. Pat. No. 4,273,681, shows typical examples, is the helical form in which substantially one smooth and one corrugated sheet-metal layer are laid on top of one another and are wound helically. In another form, the honeycomb body is composed of a multiplicity of alternately disposed smooth and corrugated or differently corrugated sheet-metal layers, with the sheet-metal layers initially forming one or more stacks which are wrapped together. In that case, the ends of all of the sheet-metal layers come to lie on the outside and can be connected to a housing or tubular casing, resulting in numerous connections, which increase the durability of the honeycomb body. Typical examples of those forms are described in European Patent 0 245 737 B1, corresponding to U.S. Pat. No. 4,832,998, or International Publication No. WO 90/03220, corresponding to U.S. Pat. No. 5,105,539. It has also long been known to equip the sheet-metal layers with additional structures in order to influence the flow and/or to achieve cross-mixing between the individual flow passages. Typical examples of configurations of that type are International Publication Nos. WO 91/01178, corresponding to U.S. Pat. No. 5,403,559; WO 91/01807, corresponding to U.S. Pat. No. 5,045,403; and WO 90/08249, corresponding to U.S. Pat. No. 5,157,010. Finally, there are also honeycomb bodies in conical form, if appropriate, which include further additional structures for influencing flow. A honeycomb body of that type is described, for example, in International Publication No. WO 97/49905, corresponding to U.S. Pat. No. 6,190,784 B1. Furthermore, it is also known to form a recess for a sensor, in particular for accommodating a lambda sensor, in a honeycomb body. One example thereof is described in German Utility Model DE 88 16 154 U1.

It has also long been known to use slotted metal sheets, in particular expanded metal and similar slot structures, for honeycomb bodies. An overview of various forms and configurations of openings in sheet-metal layers of catalyst carrier bodies is given in U.S. Pat. No. 5,599,509 together with the prior art cited therein. That device makes targeted use of openings to reduce heat capacity in a front region of a honeycomb body as compared to a rear region.

Although the extensive prior art allows many different directions to be pursued in development, some further development trends have emerged. One of those trends is the development toward ever thinner metal foils in order to be able to provide a large surface area while using small amounts of material and achieving a low heat capacity. A clear drawback of that development trend is that the thin foils become increasingly mechanically sensitive and the honeycomb bodies produced therefrom are less durable. At the same time, a trend has evolved toward ever higher cell densities, which to a certain extent is caused by the ever thinner foils being used. In order to improve mass transfer with the surfaces of a honeycomb body, structures for influencing flow were introduced into the surfaces, in particular what are known as transverse structures, or flow-guiding surfaces or additional inflow edges were created in the interior of a honeycomb body. Although the advantages of openings in the sheet-metal layers for cross-mixing are known, the systematic provision of openings through which a fluid can freely pass in the majority of the catalytic converter volume has not heretofore been considered in practice, since that runs contrary to the trend toward providing ever greater surface areas within increasingly small volumes. While slots and/or flow-guiding surfaces and similar structures do not reduce the surface area in a honeycomb body, the use of a large number of holes does considerably reduce the surface area and, moreover, at least if the holes are formed by removing material, means an increased consumption of starting material without a corresponding increase in surface area, which likewise runs contrary to prevailing trends. Therefore, holes have only been considered if they are supposed to have a specific function at a certain location in the honeycomb body, for example the function of cross-mixing or reducing the heat capacity compared to other regions.

Although that consideration, when seen in isolation, was certainly applicable to a metallic honeycomb body, one should not lose sight of the fact that a metallic honeycomb body is subsequently coated with a coating material, which in many cases also contains expensive precious metals as a catalytically active component. Consequently, a large surface area always also means a large quantity of expensive coating material. Surprisingly, tests have shown that for certain dimensions of size, distribution and density of a large number of holes over a honeycomb body, the catalytic conversion properties can be as good, with a smaller surface area, as in a honeycomb body without holes and with a larger quantity of coating material.

SUMMARY OF THE INVENTION

It is accordingly an object of the invention to provide a metallic honeycomb body having at least partially perforated sheet-metal layers, which overcomes the hereinafore-mentioned disadvantages of the heretofore-known devices of this general type and which, by virtue of having a suitable number, dimensions and distribution of holes, is particularly suitable as a carrier for a coating, in particular for economical deployment of a coating material.

With the foregoing and other objects in view there is provided, in accordance with the invention, a metallic honeycomb body, comprising an axial length, a partial volume covering at least 55% of the axial length, a radial dimension of at least 20 mm, an inflow end side and an outflow end side. Sheet-metal layers are structured to permit a fluid, in particular the exhaust gas from an internal combustion engine, to flow through the honeycomb body in a flow direction from the inflow end side to the outflow end side. The sheet-metal layers each have a surface area, partial regions and edges at the end sides. Each of the sheet-metal layers has a multiplicity of holes formed at least in the partial regions in the partial volume. Each of the holes has a hole surface area of between 1 and 120 mm$^2$. The sheet-metal layer surface area in the partial volume is reduced by 10 to 80%, preferably 35 to 60%, by the holes as compared to a sheet-metal layer without holes. The partial volume is disposed at a distance from each of the end sides, preventing the holes from touching and from cutting through the edges of the end sides of the sheet-metal layers.

Tests have shown that a honeycomb body with holes according to the invention, due to the improved flow properties in its interior and the resultant improved mass transfer properties between flow and surface, has an effectiveness which is comparable to and under certain circumstances even superior to a honeycomb body without holes, even though less coating material is used. The holes are so large that firstly they are not closed up by coating material during coating and secondly they also do not become blocked by particles in a fluid which is to be purified. Therefore, these are not holes similar to those used in a filter for retaining particles, but rather openings through which a fluid that is to be purified, in particular an exhaust gas from an internal combustion engine, can flow freely. It is important for the end-side edges not to be eaten into by holes or parts of holes, and consequently the holes should be at a distance from the end sides, for manufacture and technology reasons and with a view to subsequent durability.

In accordance with another feature of the invention, as has already been stated, the holes have more advantages than disadvantages, and consequently the partial volume provided with holes should amount to more than 60%, preferably more than 90%, of the total honeycomb body volume. This makes it possible to exploit the positive effect to its maximum extent.

In accordance with a further feature of the invention, the holes each have a surface area of from 5 to 60 mm$^2$, for mechanical and fluid dynamic reasons. With a size of this type, they are easy to produce, do not disrupt a coating process and bring about the above-mentioned advantages of improved mass transfer. Holes of this size allow good cross-mixing and also allow dissipation of heat from the interior of the honeycomb body outward, not only by thermal conduction but also by thermal radiation, which passes through the holes into regions laying further toward the outside. Of course, the larger the total area of the holes compared to the total area of the sheet-metal layers which remain, the stronger these effects become.

For comparable applications, the prior art has almost exclusively described openings in the sheet-metal layers which have polygonal contours. From a mechanical point of view, this is not advantageous under high and fluctuating loads, since cracks can form starting from the corners of the holes. Consequently, in accordance with an added feature of the invention, it is preferable to use rounded contours of the holes, so that the boundary lines of the holes do not have any corners, in particular do not have any acute angles. The holes should particularly preferably be round, oval or elliptical, in which case it is recommended, in the case of shapes which are not round, not to exceed a maximum diameter to minimum diameter ratio of two.

In accordance with an additional feature of the invention, the holes of this type cannot be produced in a material-saving manner, as is possible, for example, with expanded metal, but rather have to be produced by removal of the material from a full-area sheet-metal layer. However, the material, which is preferably removed by stamping or cutting, can be reused to produce new sheet-metal layers.

In accordance with yet another feature of the invention, depending on the way in which the sheet-metal layer is produced, the holes may also be removed as early as during the production process, an option which is suitable in particular for materials produced by galvanoplastic measures. In the case of a production process in which first of all an inexpensive material is produced and the quality of this material is subsequently improved by coating, e.g. with aluminum and/or chromium, it is recommended to produce the holes before the material is improved with these further materials.

A further advantage of the invention is that the heat capacity of a honeycomb body with holes is, of course, lower than the heat capacity of a honeycomb body without holes. On the other hand, this enables honeycomb bodies according to the invention to be produced from thicker sheet-metal layers without the heat capacity increasing as compared to honeycomb bodies made from unperforated, thinner sheet-metal layers. In accordance with yet a further feature of the invention, the thickness of the sheet-metal layers may be between 20 and 80 μm, but a thickness of from 40 to 60 μm is preferred. The preferred range leads to improved mechanical stability, in particular at the end sides of a honeycomb body, and makes it possible to use tried-and-tested production processes which can no longer readily be applied to very thin foils. Nevertheless, the heat capacity of the honeycomb bodies which form is less than or equal to that of honeycomb bodies made from thinner foils without holes.

In accordance with yet an added feature of the invention, in order to ensure mechanical stability of a honeycomb body according to the invention, the holes should have a minimum spacing of 0.5 mm, with the distances between the holes preferably in each case being approximately equal, so that no mechanical weak points are formed. Foils configured in this way can be corrugated without problems and then used in the remaining working steps for production of helical or coated and wrapped honeycomb bodies.

In accordance with yet an additional feature of the invention, the honeycomb body according to the invention, like most which are known in the prior art, particularly preferably includes alternately disposed smooth and corrugated sheet-metal layers or includes alternating differently corrugated sheet-metal layers. Structures of this type produce the typical flow passages in a honeycomb body.

Due to the positive effects of the holes, for the catalytic converters which are subsequently produced from the honeycomb bodies to have good conversion properties, it is not necessary for honeycomb bodies according to the invention to have an extremely high cell density. In accordance with again another feature of the invention, cell densities of between 200 and 1000 cpsi (cells per square inch), in particular cell densities of from 400 to 800 cpsi, are preferred.

The inventive use of holes in the sheet-metal layers does not adversely affect the usability of the sheet-metal layers for most previously disclosed additional structures for influencing flow as have been mentioned in the description of the prior art. In particular, in accordance with again a further feature of the invention, the perforated sheet-metal layers can also be provided with transverse structures, with projections and/or with flow-guiding surfaces. In general, the holes even assist the action of structures of this type, since any pressure differences which occur in the passages can be compensated for by the openings, additional turbulence is generated and the flow profile within the honeycomb body is made more uniform.

In accordance with again an added feature of the invention, the configuration of a honeycomb body according to the invention has particularly positive effects when a sensor, in particular a lambda sensor, which has been introduced into a cavity in a honeycomb body is used as proposed in the prior art. Since a measurement sensor, in particular an oxygen measurement sensor, is intended to measure a value for the fluid flowing in the honeycomb body which is as representative as possible, cross-mixing upstream of the sensor is highly advantageous. Therefore, honeycomb bodies according to the invention are particularly suitable for applications in which a lambda sensor is to be introduced into a cavity in the honeycomb body.

In manufacturing technology terms, this requires a certain level of outlay in production of the sheet-metal layers, so that after assembly they subsequently form a suitable cavity. However, nowadays this outlay is manageable by using NC (numerically controlled) manufacturing installations. This at the same time makes it possible not to position any holes close to the edges of the sheet-metal layers which delimit the cavity, in order to prevent the edges from being attacked at this location too. Therefore, in accordance with again an additional feature of the invention, it is particularly preferable for there to be no holes in a region of from 1 to 5mm around the cavity for a measurement sensor.

In accordance with still another feature of the invention, it is advantageous for the durability of a honeycomb body if the individual sheet-metal layers are connected to one another by joining, preferably by brazing, which typically takes place at the end sides of a honeycomb body. This is also a reason why no holes should intersect the end-side edge regions of the sheet-metal layers. On the other hand, the holes can also very deliberately prevent adhesive which has been applied to the end sides or brazing material which has been applied to the end sides from penetrating into the interior of the honeycomb body along the contact lines between the sheet-metal layers, which is often undesirable for mechanical reasons. In this case, holes end the capillary effect, so that the distance between the holes and the end sides of a honeycomb body can also be used very deliberately to limit a region which is connected by brazing.

In accordance with another feature of the invention, a similar statement also applies to the attachment of the sheet-metal layers to a tubular casing. In this case too, due to the very stable connection to the tubular casing which is desired, it is more favorable if the edge regions are not intersected by holes. Furthermore, in this case too, the holes ensure that the brazing material cannot penetrate too far into the interior of the honeycomb body through the use of capillary action, but rather remains precisely where it is used to secure the sheet-metal layers.

The size of the honeycomb body volume in catalytic converters (the sum of the volumes of the sheet-metal layers as well as the passages, openings, holes, etc. which are formed or enclosed) is dependent, for example, on the positioning in the exhaust section: if it is disposed in the engine compartment or in the immediate vicinity of the engine (within a distance of up to 0.5 m), this size is usually less than the capacity of the engine, e.g. less than 50% of the capacity, in particular less than 1 liter or 0.5 liters. If it is disposed in the underbody of a passenger car, the honeycomb body volume may also be greater than the capacity of the engine, preferably between 1 and 5 liters. Different sizes may also result in other applications such as, for example, for use in trucks, motorcycles, lawnmowers, hand-held appliances (hedge clippers, power saws, etc.) or the like, in which case the corresponding person skilled in the art can make suitable modifications. A similar statement is true for honeycomb bodies which are used as heat exchangers, flow mixers, adsorbers, particle traps, particulate filters and electrical heaters in exhaust systems. In these cases too, the person skilled in the art is aware of a range of tests which allow the honeycomb body volume to be suitably adapted.

When constructing or configuring the pattern of holes in the sheet-metal layer, the desired application of the honeycomb bodies should also be taken into account. Since in this context it has not been possible to make use of knowledge gained from experience, tests have shown that the effects of the mixing or catalytic conversion combined, at the same time, with a considerably reduced deployment of catalytic material, were surprisingly good in sheet-metal foils with holes having a maximum extent which was greater than the structure width of the corrugation, in particular with holes in which even the shortest distance between opposite contours of the holes was still greater than the structure width. This preferably applies to the holes in the at least partially structured sheet-metal layers, so that the holes are superimposed on the corrugation or structure. In accordance with a further feature of the invention, it is particularly advantageous for all of the holes in the at least one partial volume to have an extent which is greater than the structure width. In accordance with an added feature of the invention, surprisingly good results can be achieved with a honeycomb body having sheet-metal foils in which the size of the hole is at least twice, preferably four times, in particular six times, as great as the structure width.

In accordance with an added feature of the invention, at least some of the holes are constructed as slots having a maximum extent in each case which extends in the direction of a dedicated main axis. The holes constructed as slots are disposed in such a way that the honeycomb body has zones of different rigidities. In this context, a slot is understood as meaning in particular a hole which has two opposite rounded, preferably semicircle-like tip regions, the maxima or turning points of which define the main axis. The slot preferably has edges which run parallel to one another between these tip regions. The maximum extent in the direction of the main axis is preferably greater by at least a factor of two than the extent perpendicular to the main axis. The result of this is that webs are formed between adjacent slots. In this context, it is now proposed for these slots to be oriented in such a way with respect to the direction of the circumference, the radius, the center axis of the honeycomb body or of the sheet-metal layer or at least two of these directions in such a way that the rigidity of the honeycomb body differs in a plurality of zones. In this context, the term rigidity is to be understood as meaning the extent to which the zones yield to external forces in at least one of the above-mentioned directions. This means, for example, that in a first (in particular gas entry side) and if appropriate also in a third (in particular gas exit side) zone, the slots are disposed in such a way that the honeycomb body has a very low rigidity, while in a second (in particular inner) zone the honeycomb body is constructed to be relatively rigid. By way of example, if the thermal expansion characteristics of honeycomb bodies of this type in the exhaust system of an automobile are considered, it is established that the end sides expand and contract to a considerably greater extent due to the fluctuating thermal loads than central regions of the honeycomb body. The different zones make it possible to compensate for or interrupt differential thermal expansions of this type or different levels of forces introduced (e.g. as a result of pulses in the exhaust gas flow).

In accordance with a concomitant feature of the invention, in this context, it is preferable for the holes which are constructed as slots to be at least partially offset with respect to one another in the direction of a circumference and/or a radius and/or a center axis and/or to be disposed at an angle in terms of their main axes. This means, for example, that:
 the holes are disposed in lines or rows parallel to the edge region, and that the lines or rows (or groups of adjacent lines or rows) which are adjacent in the direction parallel to the attachment region are offset with respect to one another in the direction of the edge region (with an identical or variable spacing between one another);
 the holes are disposed in lines or rows parallel to the attachment region, and that the lines or rows (or groups of adjacent lines or rows) which adjoin one another in the direction parallel to the edge region are offset with respect to one another in the direction of the attachment region (with an identical or variable distance between one another);
 the holes are oriented obliquely with respect to one another, in particular with main axes which are not at a right angle with respect to the orientation of the edge or attachment regions;
 at least in partial regions of the zones, the holes form a type of latticework;
 the holes generate different thicknesses of webs and/or different orientations of the webs with respect to the honeycomb body; or
 the holes are disposed in accordance with partial combinations as mentioned herein, in order to produce differing rigidities of the honeycomb body over its axial extent and/or its radius and/or its circumference.

Other features which are considered as characteristic for the invention are set forth in the appended claims.

Although the invention is illustrated and described herein as embodied in a metallic honeycomb body having at least partially perforated sheet-metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, plan view of a sheet-metal layer for the production of a honeycomb body according to the invention;

FIG. 2 is a partly broken-away and sectional perspective view of a honeycomb body according to the invention;

FIG. 3 is a partly broken-away and sectional side-elevational view of a catalytic converter having a honeycomb body according to the invention and a cavity for a lambda sensor;

DESCRIPTION OF THE PREFERRED EMBODIMENTS

Figure 4:
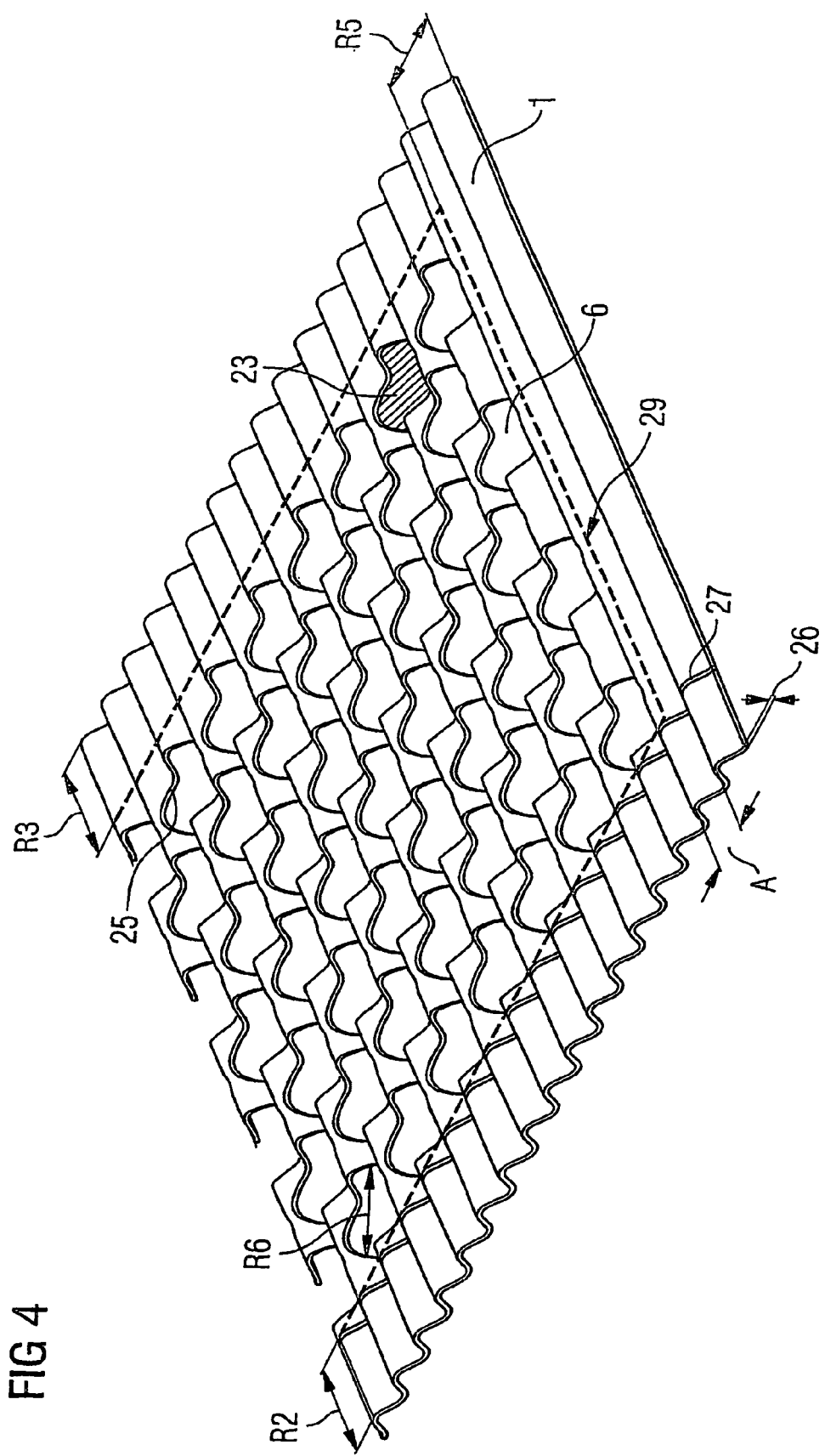
FIG. 4 is a perspective view of a corrugated sheet-metal layer with holes.
Figure 5:
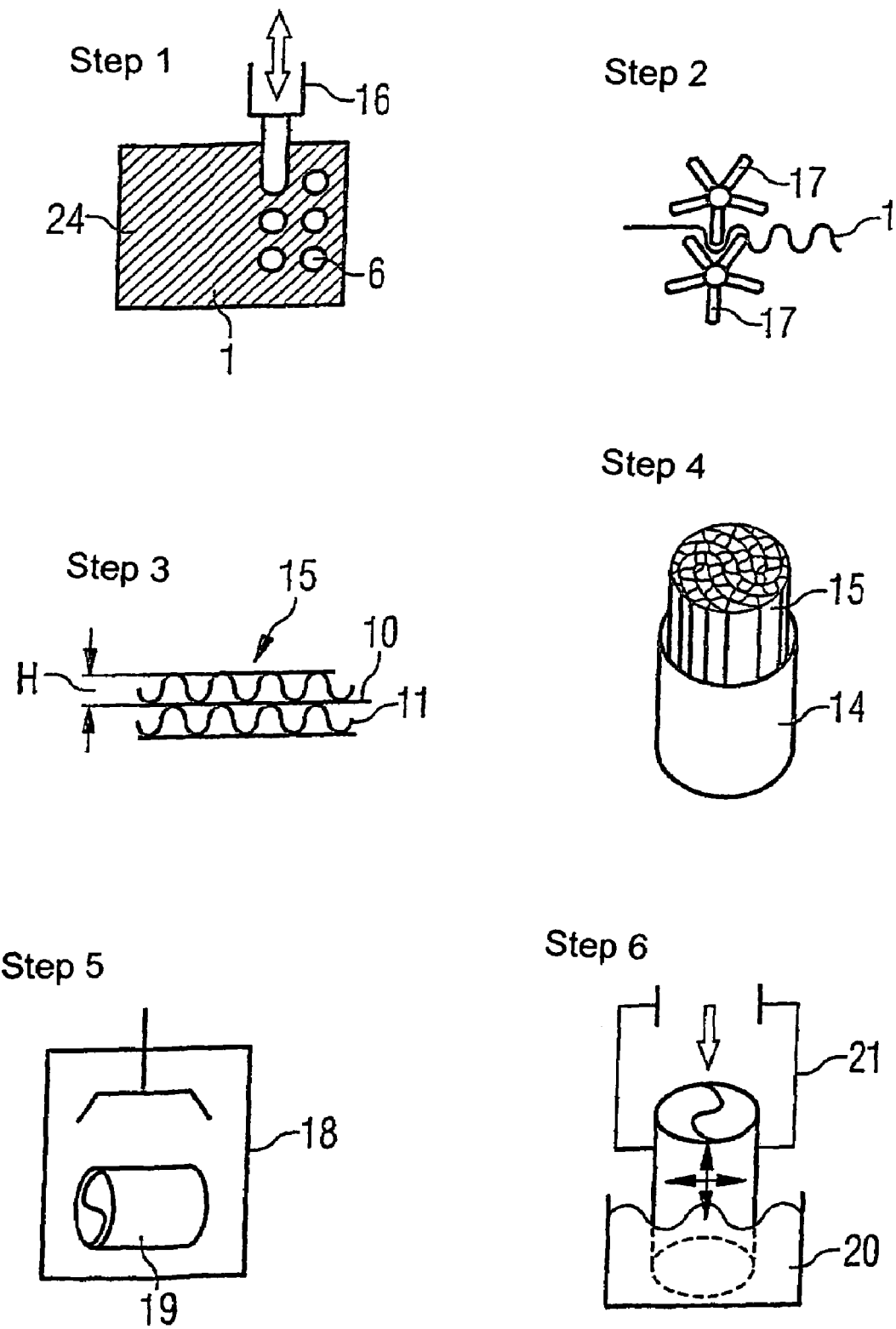
FIG. 5 includes a series of views illustrating a sequence of a process for producing a honeycomb body according to the invention.

Referring now to the figures of the drawings in detail and first, particularly, to FIG. 1 thereof, there is seen a sheet-metal layer 1, which may be either smooth or corrugated. Such a sheet-metal layer 1 is used to construct a honeycomb body 15 according to the invention, as is seen in FIG. 2. This sheet-metal layer 1 has a width L which subsequently determines an axial length L of the honeycomb body 15 produced therefrom, as is seen in FIG. 3. The size of the sheet-metal layer 1 in the other direction is dependent on the type of construction of the honeycomb body 15 which is to be produced. The size in the other direction may be very long if a helically wound honeycomb body 15 is to be produced therefrom or relatively short if it forms part of a stack of a plurality of sheet-metal layers 1 of this type which is subsequently wrapped to form a honeycomb body 15. The sheet-metal layer 1 has a thickness 26, shown in FIG. 4, which may be between 20 and 80 µm, preferably between 40 and 60 µm. In a partial region (in this case illustrated as a section 29), the sheet-metal layer 1 has a large number of holes 6, each of which has a hole surface area 23 of between 1 and 120 mm$^2$, as is shown in FIG. 4 The holes 6 preferably have a diameter of between 3 and 8 mm and preferably between 4 and 6 mm. At least in regions, these holes 6 are disposed in a regular pattern and are preferably at identical distances D7 from one another. However, it is also possible to vary the pattern from an inflow end side 12 to an outflow end side 13, in which case, by way of example, the number of holes, the diameter of the holes and/or the distances D7 are increased. This increase may take place continuously or in steps. It is also advantageous, after these values have been increased in a central region, for them to be reduced again toward the outflow end side 13 for certain applications. It is preferable for the holes 6 to be round or elliptical or oval with a maximum diameter R6 of up to 8 mm. The distances D7 between the holes 6 are selected in such a way that a sheet-metal layer surface area 24, indicated in FIG. 5, is reduced by from 10 to 80%, preferably 30 to 60%, as compared to an unperforated surface.

The sheet-metal layer 1 has an inflow-side edge region 2 which is free of holes 6. It is preferable for an outflow-side edge region 3 likewise to be free of holes 6. This simplifies the processing of the sheet-metal layer 1, makes it possible to connect sheet-metal layers to one another in this edge region and prevents irregularly shaped (jagged) inflow end sides 12 or outflow end sides 13 from being formed during construction of a honeycomb body 15. The inflow-side edge region has a width R2 of from 1 to 5 mm, and the outflow-side edge region 3 has a width R3 of from 1 to 5 mm. Moreover, the sheet-metal layer 1 has at least one first attachment region 4, through the use of which the sheet-metal layer 1 can be subsequently secured to a tubular casing 14 shown in FIGS. 2 and 3. This attachment region 4, having a width R4, is preferably also free of holes 6. A second attachment region 5 with a width R5 is also free of holes 6 for configurations of honeycomb bodies 15 in which the sheet-metal layers 1 are secured to a tubular casing 14 at both ends.

If the sheet-metal layer 1 is to be used to produce a honeycomb body 15 which has a cavity 7 for accommodating a measurement sensor 9 shown in FIG. 3, a corresponding cavity 7 is to be provided in the sheet-metal layer 1. According to the invention, this cavity is surrounded by a hole-free edge 8, which is once again used to make the sheet-metal layer 1 easier to process and to facilitate production of a uniform cavity 7. A flow direction S of a fluid which can subsequently flow through the honeycomb body 15 is indicated by arrows in the figures. A path length B of the hole-free edge 8 is preferably at least 1 mm over the entire circumference of the cavity.

FIG. 2 shows a perspective view of a honeycomb body 15 according to the invention in which a dimension 22 of a perforated partial volume T is diagrammatically indicated. In this case, the dimension 22 starts from the center of the cross section of the honeycomb body, but it is also possible for the partial volume T to be formed as a type of inner, annular hollow cylinder in which the dimension 22 forms any desired part of the diameter or radius of the cross section. The honeycomb body 15, which is shown by way of example, is wound helically from a smooth sheet-metal layer 10 and a corrugated sheet-metal layer 11, which are connected to a tubular casing 14 in an attachment region 4.

FIG. 3 diagrammatically depicts a partially cut-away side view of a catalytic converter 28 with a cavity 7 for receiving a lambda sensor 9. An exhaust gas can flow through the catalytic converter 28 in the flow direction S starting from the inflow end side 12 and leading to the outflow end side 13. There is a hole-free edge region 2 at the inflow end side 12 and a hole-free edge region 3 at the outflow end side 13. The perforated partial volume T is disposed between these edge regions and therefore extends over virtually the entire axial length L of the honeycomb body 15. The cavity 7 in the honeycomb body 15 was produced either after the honeycomb body 15 had been completed or before it had been completed by suitable positioning of cavities 7 in the individual sheet-metal layers 10, 11. The measurement sensor 9, in particular an oxygen measurement sensor 9, can be introduced into this cavity 7. In order to ensure uniform edges of the cavity 7, the hole-free edge 8, in which the sheet-metal layers 10, 11 do not have any holes 6, surrounds the cavity 7. The combination of a honeycomb body 15 with holes 6 and a cavity 7 for a measurement sensor 9 which is illustrated herein is particularly advantageous because the holes 6 upstream of the measurement sensor 9 allow cross-mixing in the honeycomb body 15 and consequently the measurement sensor 9 can measure a representative measured value for the composition of the fluid in the honeycomb body 15 as a whole.

FIG. 4 shows a diagrammatic and perspective illustration of a corrugated sheet-metal layer 1 with holes 6. The corrugations or structure of the sheet-metal layer 1 can be described, for example, by a structure height H and a structure width A, as seen in FIGS. 4 and 5. The above-mentioned advantages, in particular with regard to the cross-mixing of the exhaust-gas stream and the inexpensive production of a honeycomb body 15 of this type, can be achieved particularly successfully if the maximum extent R6 of a hole 6 is greater than the structure width A. In the illustrated exemplary embodiment, the holes 6 have an extent or diameter R6 which corresponds to approximately three times the structure width A of the sinusoidal corrugation of the sheet-metal layer 1. In this case, the holes 6 are disposed in such a way that there is a regular pattern in which each corrugation peak or corrugation valley is interrupted at least by one hole 6 over the axial length within the section 29 which is delimited by the unperforated edges R3, R2, R5 (and the non-illustrated edge R4) of the sheet-metal layer 1 and forms the partial volume T in the honeycomb body 15. With regard to the proportion of the sheet-metal layer surface area 24 which is taken up by the holes 6, it should be noted that in particular the sheet-metal layer surface area 24 within the section 29 is reduced by 30–60%, and preferably the overall sheet-metal layer surface area 24 (i.e. including the edges) is reduced by 20–40%.

In order to achieve the maximum possible amount of perforation in the section 29, it is advantageous, as illustrated in FIG. 4, for the distances D7 between the holes to be selected to be no greater than a few structure widths A, in particular less than 5 structure widths A and preferably less than 3 structure widths A, of the sheet-metal layer 1. For stability reasons, for particular applications of the honeycomb body 15, it is also possible under certain circumstances for the distances D7 in different directions (e.g. in the longitudinal and transverse directions) to be constructed to differ from one another in terms of their size, in which case it is preferable for a uniform distance D7 between the holes 6 to be maintained in one direction.

Moreover, in the vicinity of the edge R2, FIG. 4 shows a microstructure 27, the height of which is considerably less than the structure height H. The microstructure 27 is used, for example, to delimit the attachment region, since in this way a small gap is formed between the sheet-metal layers 1 disposed adjacent one another. During a brazing process, this gap prevents liquid brazing material from accumulating in the section 29 as a result of capillary effects, where it may produce undesirable connections.

FIG. 5 diagrammatically depicts a possible particularly suitable process for producing a catalytic converter. In a first step 1, the holes 6 are introduced into the sheet-metal layer 1. In this case, step 1 is carried out mechanically through the use of a stamping device 16. In the next step 2, the structures are produced in the perforated sheet-metal layer 1 through the use of two meshing profiling tools 17, so that corrugated sheet-metal layers 11 with a structure height H and a structure width A are formed. These corrugated, at least partially perforated sheet-metal layers 11 are then stacked with smooth sheet-metal layers 10 (perforated or unperforated) to form a honeycomb body 15 in a step 3. These sheet-metal layers 10, 11 are then wound together and introduced into a tubular casing 14 in a step 4. After the sheet-metal layers 10, 11 have been stacked and/or wound, the way in which the holes 6 in the adjacent sheet-metal layers 10, 11 are disposed with respect to one another may be of importance. In principle, it is possible for the holes to be oriented with respect to one another in such a way that they (almost completely) overlap one another. This may be advantageous, for example, if high levels of pressure losses (as may occur with a very turbulent flow) are to be avoided. On the other hand, if the flow is substantially uniform when it enters the honeycomb body 15, it is advantageous for the maximum possible number of inflow edges which lead to swirling to be provided in the interior of the honeycomb body 15. It is therefore expedient in the latter case for the holes 6 in the adjacent sheet-metal layers 10, 11 to be offset with respect to one another. In addition to the possible variations with regard to the relative position of the holes 6 with respect to one another, it is also advantageous to consider using different forms of holes 6 even when the holes 6 are superimposed or overlap. For example, different distances D7 between the holes, different maximum extents R6 or different contours 25 of the holes 6 themselves as seen in FIG. 4, as well as their relative position with respect to one another in the sheet-metal layers 10, 11 disposed adjacent one another can be combined with one another.

After a brazing process in which, in particular, the unperforated regions or edges R1, R2, R3, R4 are provided with non-illustrated brazing material, the sheet-metal layers are subjected to a heat treatment with one another and also with the tubular casing 14 in a furnace 18 in a step 5. In particular, they are subjected to high-temperature brazing in vacuo and/or under a shielding gas atmosphere. A support body 19 produced in this way can then also be provided with a catalytically active coating 20 in order to enable it to be ultimately used as a catalytic converter in the exhaust system of a motor vehicle.

The support body 19 is coated with what is known as a washcoat, which has a very rugged surface. This rugged surface firstly ensures that sufficient space is available for fixing a catalyst (e.g. platinum, rhodium, etc.) and secondly is used to swirl up the exhaust gas flowing through, producing particularly intensive contact with the catalyst. The washcoat usually is formed of a mixture of an aluminum oxide from the transition series and at least one promoter oxide such as, for example, rare earth oxides, zirconium oxide, nickel oxide, iron oxide, germanium oxide and barium oxide.

The washcoat layer having a large surface area which promotes catalysis is applied in a known way by immersing the honeycomb body 15 or the support body 19 in or spraying it with, a liquid washcoat dispersion. However, particularly in the case of the perforated sheet-metal layers 11, there is a risk of the washcoat dispersion covering and closing up the holes 6. This would lead to the level of perforation in the partial volume T of the honeycomb body 15 being lower than desired, with the result that firstly the cross-mixing between the exhaust-gas partial streams which are formed as a result of the exhaust gas coming into contact with the honeycomb-like form of the end side 12 of the honeycomb body 15 being reduced and secondly too much washcoat dispersion being required. For this reason, the coating operation is carried out in a step 6 by using a vibratory installation 21, which generates relative motion between the washcoat dispersion and the support body 19. This relative motion includes, in particular, continuous and/or discontinuous vibration, pulsed excitation (e.g. similar to a hammer blow) or similar stimulation of the support body 19, which may also be combined with one another in any desired sequence and/or in different directions.

If the washcoat dispersion is to be excited directly, a frequency in the ultrasound range, for example, has proven particularly advantageous. The excitation took place in a frequency range from 20 kHz to 10 MHz. In particular, in the case of indirect excitation, i.e. for example, brought about by vibration of the support body 19, frequencies in the audible range have proven appropriate, in which case in particular excitation at a frequency of between 20 Hz and 15 kHz has ensured a drop in the viscosity of the washcoat dispersion over a very prolonged period. The result of this is that a uniform distribution of the dispersion is ensured. Furthermore, it has proven particularly advantageous for the support body 19 to be excited one final time in a pulse-like manner, in particular after it has emerged from the coating bath, in order to ensure that there are no longer any holes 6 covered over by the washcoat dispersion.

After the excess washcoat dispersion has been removed, the washcoat is dried in the honeycomb body and finally calcined at temperatures which are generally above 450° C. During the calcining, the volatile constituents of the washcoat dispersion are forced out, so that a temperature-resistant, catalysis-promoting layer with a high specific surface area is produced. If appropriate, this operation may be repeated a number of times in order to achieve a desired layer thickness.

Figure 6:
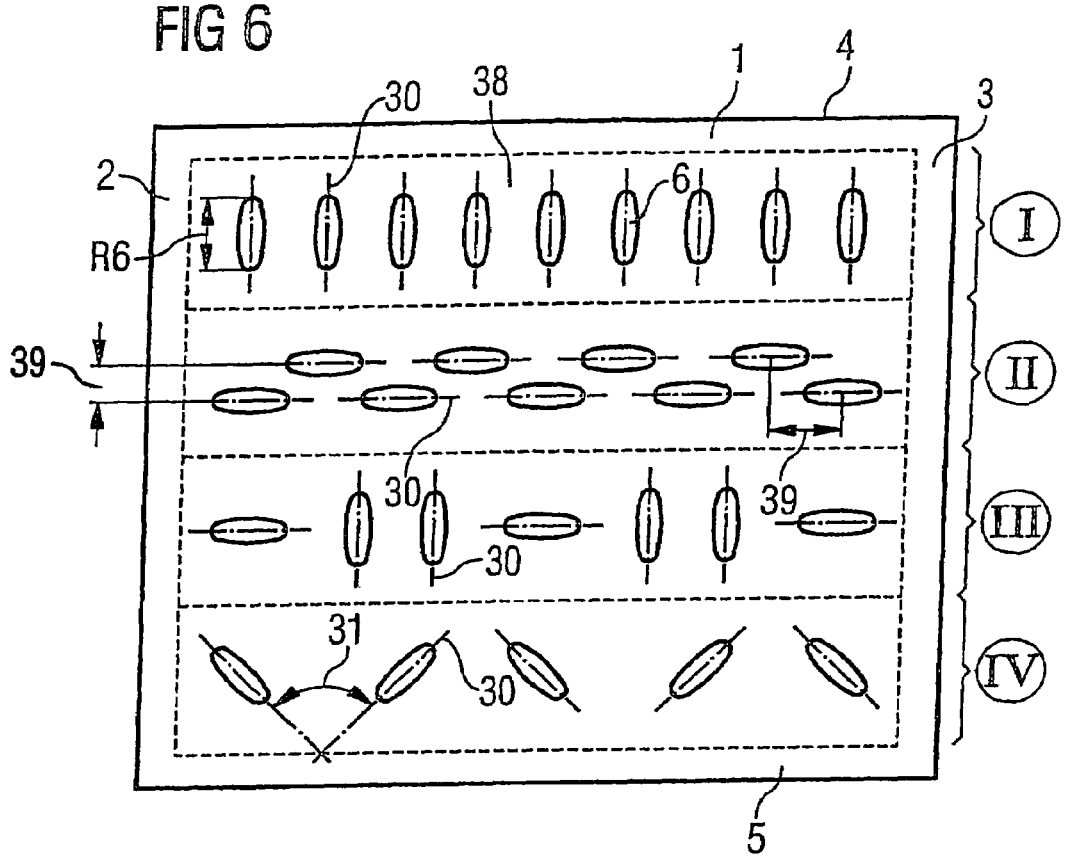
FIG. 6 is a plan view of a configuration of a sheet-metal layer with slots.

FIG. 6 diagrammatically depicts a configuration of a sheet-metal layer 1 with holes 6 which are formed as slots. This figure illustrates the sheet-metal layer 1 including its attachment regions 4, 5 and its edge regions 2, 3. In this context, it should be noted that the holes 6 do not have to extend over the entire length and/or width of the sheet-metal layer 1. The sheet-metal layer 1 is diagrammatically divided into four sectors (denoted by numerals I, II, III and IV). The holes 6 which are constructed as slots and the maximum extent R6 of which in each case extends in the direction of a dedicated main axis 30 are disposed differently with respect to one another in the sectors. The holes 6 which are constructed as slots are at least in some cases offset with respect to one another in the direction of a circumference 37 and/or a radius 36 and/or a center axis 35 seen in FIG. 7 and/or are disposed at an angle 31 seen in FIG. 6 in terms of their main axes 30.

In the first sector I, the main axes 30 of the holes 6 have the same orientation, and accordingly they are parallel to one another. The illustrated lines or rows of holes 6 may be repeated constantly within a zone 32, 33, 34 seen in FIG. 7, but it is also possible for the lines or rows to be disposed obliquely with respect to one another and/or for the holes 6 in the lines or rows to be offset with respect to one another. In the second sector II, the slots are illustrated with a different orientation from those in the first sector I, in such a way that the lines or rows within the second sector are offset with respect to one another. In the third sector III, it can be seen that combinations of the configurations of these slots described above are also possible.

The fourth sector IV illustrates a relatively rigid configuration of the slots, that is a latticework. The main axes 30 of the adjacent holes 6 are at an angle 31 with respect to one another. This angle preferably lies in a range of from 30° to 6020. A latticework of this type can also be formed by the holes 6 which are constructed as slots being oriented in lines or rows and, in terms of their main axes 30, obliquely with respect to the edge regions 2, 3. In that case all of the slots within the line or row have the same orientation, while the adjacent lines or rows running parallel are disposed offset, with the slots at a different angle with respect to the edge regions 2, 3. It is preferable for the slots of the adjacent lines or rows to be disposed in such a way that the main axes of the holes 6 in a first line are oriented perpendicular with respect to the main axes of the slots disposed in the adjacent lines or rows and/or the main axes of the slots in the first line or row intersect the center of the slots of the adjacent lines or rows.

Figure 7:
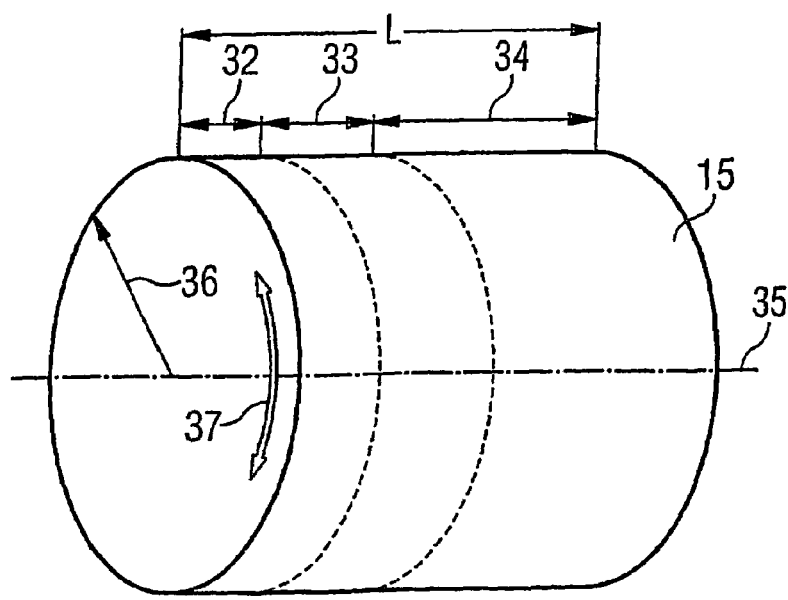
FIG. 7 is a perspective view of a honeycomb body with a plurality of zones of different rigidity.

The configuration of the holes 6 means that the sheet-metal layer 1 reacts to external forces with different levels of sensitivity in the sectors. In the first sector, it is relatively rigid with respect to forces from the direction of the attachment regions 5, 4 but more elastic with regard to forces perpendicular thereto. The exact opposite is true of sector II. Accordingly, the rigidity characteristics of the honeycomb body 15 can be set in a zoned manner in the zones 32, 33, 34 according to the orientation of the holes 6. The zones 32, 33, 34 can divide the honeycomb body in the direction of the axial length L, the circumference 37 or the radius 36. Although FIG. 7 shows only three zones, under certain circumstances it is also possible to provide two or more zones.

The present invention allows a high coating effectiveness for the treatment of a fluid to be achieved in most known forms of honeycomb bodies, with a reduced usage of coating material, while nevertheless enabling properties relating to mechanical stability, heat capacity, thermal conductivity and the like of a honeycomb body to be specifically matched to the requirements of individual applications.

What is claimed is:

1. A metallic honeycomb body, comprising:
    an axial length, a partial volume covering at least 55% of said axial length, a radial dimension of at least 20 mm, an inflow end side and an outflow end side;
    sheet-metal layers being corrugated for permitting a fluid to flow through the honeycomb body in a flow direction from said inflow end side to said outflow end side, said sheet-metal layers each having a surface area, partial regions, edges at said end sides, and corrugation peaks and corrugation valleys defining a structure width;
    each of said sheet-metal layers having a multiplicity of holes formed at least in said partial regions in said partial volume, said holes interrupting each said corrugation peak or said corrugation valley with at least one hole over said axial length;
    each of said holes having a hole surface area of between 5 and 120 mm$^2$;
    said sheet-metal layer surface area in said partial volume being reduced by 30 to 80% by said holes as compared to a sheet-metal layer without holes; and
    said partial volume being disposed at a distance from each of said end sides, preventing said holes from touching and from cutting through said edges of said end sides of said sheet-metal layers.

2. The honeycomb body according to claim 1, wherein said sheet-metal layer surface area in said partial volume is reduced by 35 to 60% by said holes, as compared to a sheet-metal layer without holes.

3. The honeycomb body according to claim 1, wherein said sheet-metal layers have a structure guiding exhaust gas from an internal combustion engine through the honeycomb body.

4. The honeycomb body according to claim 1, wherein said partial volume amounts to more than 60% of a total honeycomb body volume.

5. The honeycomb body according to claim 1, wherein said partial volume amounts to more than 90% of a total honeycomb body volume.

6. The honeycomb body according to claim 1, wherein said hole surface area of each of said holes is from 5 to 60 mm$^2$.

7. The honeycomb body according to claim 1, wherein said holes have rounded contours.

8. The honeycomb body according to claim 1, wherein said holes have a shape selected from the group consisting of round, oval and elliptical.

9. The honeycomb body according to claim 1, wherein said holes are formed in said sheet-metal layer by removing material from a full-area of said sheet-metal layer.

10. The honeycomb body according to claim 1, wherein said holes are formed as early as during production of said sheet-metal layer.

11. The honeycomb body according to claim 1, wherein said sheet-metal layers have a thickness of 20 to 80 µm.

12. The honeycomb body according to claim 1, wherein said sheet-metal layers have a thickness of 40 to 60 µm.

13. The honeycomb body according to claim 1, wherein said holes are mutually spaced apart by a minimum distance of 0.5 mm.

14. The honeycomb body according to claim 13, wherein all of said holes are spaced apart by approximately equal distances.

15. The honeycomb body according to claim 1, wherein said sheet-metal layers are alternating smooth and corrugated sheet-metal layers.

16. The honeycomb body according to claim 1, wherein said sheet-metal layers are alternating differently corrugated sheet-metal layers.

17. The honeycomb body (15) according to claim 1, wherein said structured sheet-metal layers form a honeycomb body cell density of 200 to 1000 cpsi (cells per square inch).

18. The honeycomb body (15) according to claim 1, wherein said structured sheet-metal layers form a honeycomb body cell density of 400 to 800 cpsi (cells per square inch).

19. The honeycomb body according to claim 1, wherein said sheet-metal layers have microstructures for influencing flow.

20. The honeycomb body according to claim 19, wherein said microstructures are at least one of transverse structures, projections and flow-guiding surfaces.

21. The honeycomb body according to claim 1, which further comprises a cavity for accommodating a sensor.

22. The honeycomb body according to claim 21, which further comprises a lambda sensor disposed in said cavity.

23. The honeycomb body according to claim 21, wherein said cavity is disposed within said partial volume.

24. The honeycomb body according to claim 21, wherein said cavity is disposed downstream of said partial volume in said flow direction.

25. The honeycomb body according to claim 21, wherein said sheet-metal layers have edges adjoining said cavity, and said edges are free of holes over a path of from 1 to 5 mm to said cavity.

26. The honeycomb body according to claim 1, wherein said sheet-metal layers are connected to one another by joining at least in said partial regions at said end sides.

27. The honeycomb body according to claim 26, wherein said sheet-metal layers are connected to one another by brazing.

28. The honeycomb body according to claim 1, wherein said sheet-metal layers have edge regions without holes, and said sheet-metal layers are connected to one another by joining in said edge regions without holes.

29. The honeycomb body according to claim 1, wherein said structured sheet-metal layers have a structure width, and said holes have a maximum extent being greater than said structure width.

30. The honeycomb body according to claim 1, wherein said structured sheet-metal layers have a structure width, and said holes each have a maximum extent being greater than said structure width.

31. The honeycomb body according to claim 1, wherein said structured sheet-metal layers have a structure width, and all of said holes in said at least one partial volume have an extent greater than said structure width.

32. The honeycomb body according to claim 1, wherein said structured sheet-metal layers have a structure width, and each of said holes has an extent being at least twice as great as said structure width.

33. The honeycomb body according to claim 1, wherein said structured sheet-metal layers have a structure width, and each of said holes has an extent being four times as great as said structure width.

34. The honeycomb body according to claim 1, wherein said structured sheet-metal layers have a structure width, and each of said holes has an extent being six times as great as said structure width.

35. The honeycomb body according to claim 1, wherein at least some of said holes are slots each having a dedicated main axis and a maximum extent extending in direction of said dedicated main axis, and said slots define zones of different rigidities of the honeycomb body.

36. The honeycomb body according to claim 35, wherein said slots are at least one of:
   at least partially mutually offset in direction a circumference;
   at least partially mutually offset in direction a radius;
   at least partially mutually offset in direction a center axis; and
   disposed at an angle relative to said main axes.

37. A honeycomb assembly, comprising:
   a tubular casing; and
   a metallic honeycomb body disposed in said tubular casing, said honeycomb body including:
      an axial length, a partial volume covering at least 55% of said axial length and not touching said tubular casing, a radial dimension of at least 20 mm, an inflow end side and an outflow end side;
      sheet-metal layers being corrugated for permitting a fluid to flow through said honeycomb body in a flow direction from said inflow end side to said outflow end side, said sheet-metal layers each having a surface area, partial regions, edges at said end sides, corrugation peaks and corrugation valleys defining a structure width, and attachment regions bearing against and secured to said casing internally within said casing by joining;
      each of said sheet-metal layers having a multiplicity of holes formed at least in said partial regions in said partial volume, said holes interruptinq each said corrugation peak or said corrugation valley with at least one hole over said axial length, and said attachment regions being free of holes;
      each of said holes having a hole surf ace area of between 5 and 120 $mm^2$;
      said sheet-metal layer surface area in said partial volume being reduced by 30 to 80% by said holes as compared to a sheet-metal layer without holes; and
      said partial volume being disposed at a distance from each of said end sides, preventing said holes from touching and from cutting through said edges of said end sides of said sheet-metal layers.

38. The assembly according to claim 37, wherein said attachment regions are secured to said casing by brazing.

* * * * *